Patented Sept. 22, 1925.

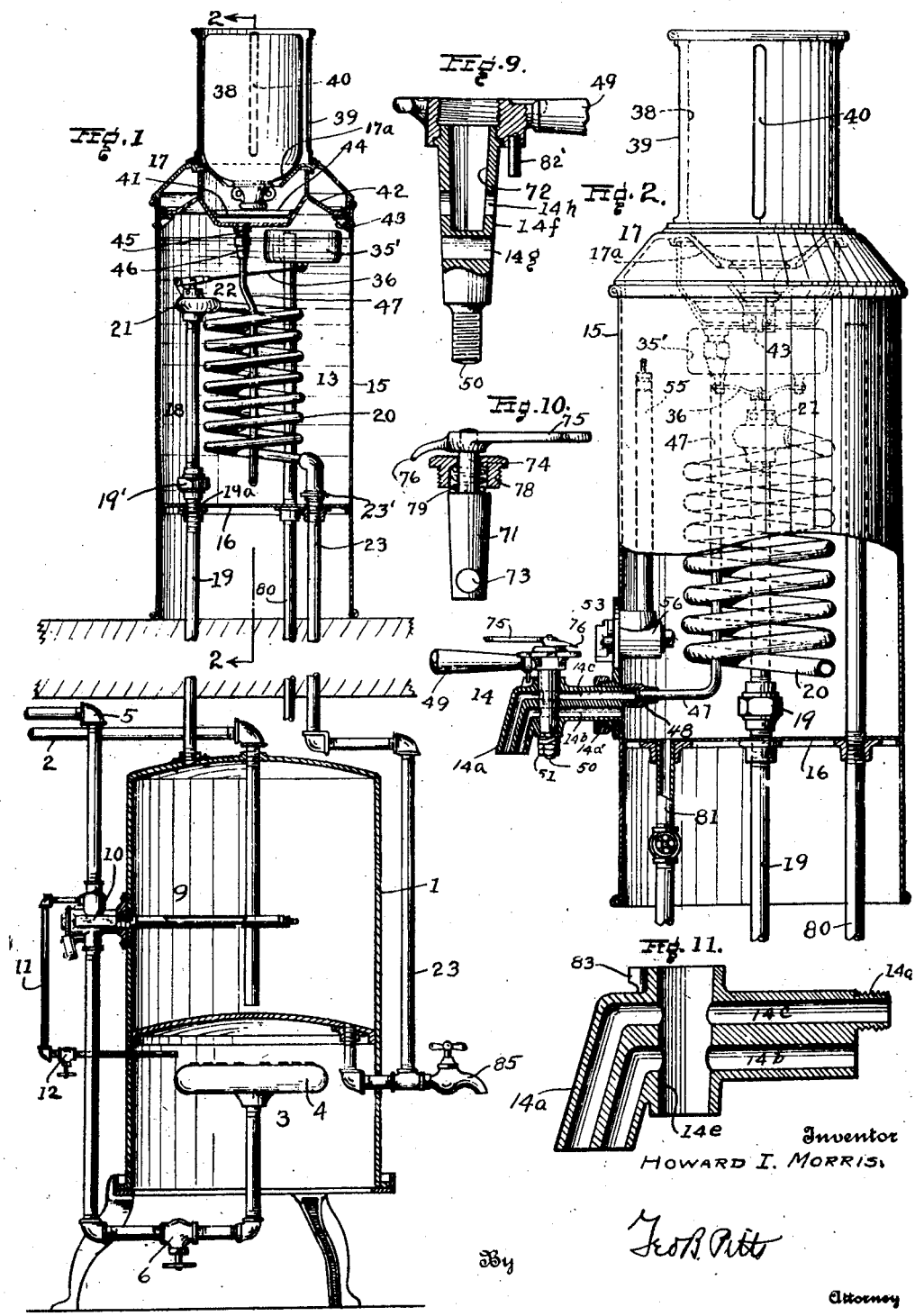

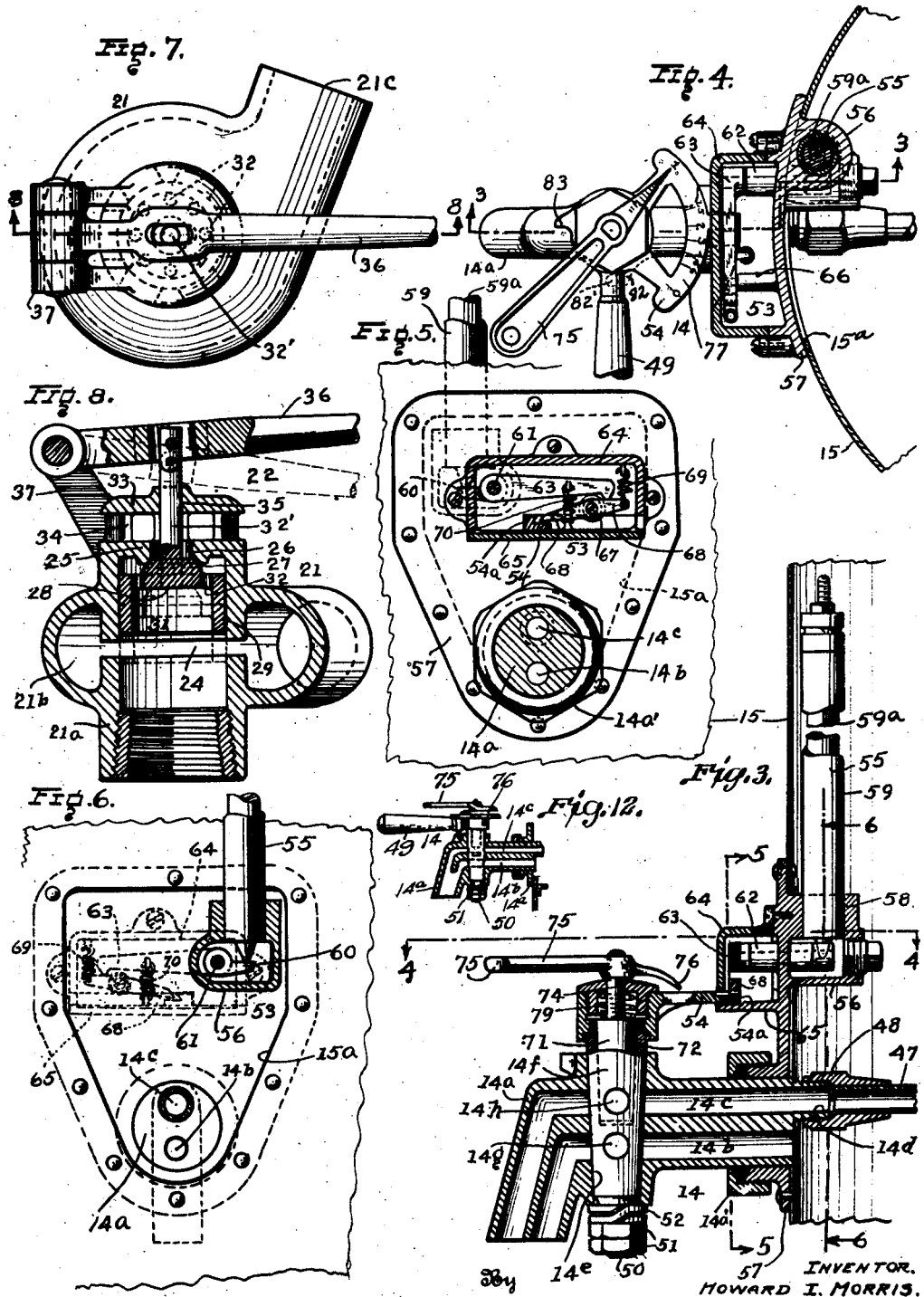

1,554,364

UNITED STATES PATENT OFFICE.

HOWARD I. MORRIS, OF CLEVELAND, OHIO, ASSIGNOR TO THE YODER-MORRIS COMPANY, OF CLEVELAND, OHIO, A CORPORATION OF OHIO.

APPARATUS FOR SUPPLYING, HEATING, AND DISPENSING LIQUIDS.

Application filed October 31, 1921. Serial No. 511,811.

*To all whom it may concern:*

Be it known that I, HOWARD I. MORRIS, a citizen of the United States, residing at Cleveland, county of Cuyahoga, and State of Ohio, have invented certain new and useful Improvements in and Relating to Apparatus for Supplying, Heating, and Dispensing Liquids, of which the following is a specification.

This invention relates to an apparatus for supplying a liquid at any desired degree of temperature and maintaing such supply at approximately the desired temperature, whereby it can be used at will; more particularly the invention relates to an apparatus in which a liquid maintained at a predetermined temperature, may be dispensed from time to time.

For illustration purposes, this invention is disclosed in connection with a generating or mixing apparatus, wherein two or more liquids, one of which is heated, are dispensed for making a desired product, such as a beverage; and as showing one application of such an apparatus, I have disclosed it as applied to the making of coffee, preferably of the type in which the heated water and concentrated liquid coffee are simultaneously dispensed into a receptacle and served for drinking purposes.

My invention comprehends an apparatus in which a liquid is automatically supplied and maintained at the desired temperature and in which the dispensing of the liquid or of a plurality of liquids are controlled by the temperature of that liquid which is maintained at the predetermined temperature; and accordingly one object of the invention is to provide a dispensing means which is controlled by the temperature of the liquid or one of the liquids to be dispensed, whereby the operation of the dispensing means is prevented until such liquid has attained the desired degree of temperature suitable for making the beverage.

Another object of the invention is to provide an improved apparatus for supplying and maintaining heated liquid in a holding receptacle from which the liquid may be discharged as desired.

Another object of the invention is to provide an improved apparatus for maintaining a predetermined quantity of heated liquid in a receptacle so arranged that the source of heated liquid supply may be utilized to either maintain the liquid at the desired temperature or supply liquid to the receptacle as the liquid is discharged therefrom.

Another object of the invention is to provide an improved dispensing means for two or more liquids, whereby the same may be uniformly mixed at all times.

A further object of the invention is to provide an improved beverage generating and dispensing apparatus capable of operation in an economical manner with respect to both labor and fuel cost.

Other objects of the invention will be apparent to those skilled in the art to which the invention relates from the following description taken in connection with the accompanying drawings, wherein is shown for illustrative purposes one embodiment of my invention.

In the drawings, Fig. 1 is a vertical sectional view of an apparatus embodying my invention, parts being broken away to facilitate the illustration.

Fig. 2 is a view partly in section on the line 2—2 of Fig. 1.

Fig. 3 is a fragmentary view of parts shown in Fig. 2.

Fig. 4 is a section on the line of 4—4 Fig. 3.

Fig. 5 is a section on the line of 5—5 of Fig. 3.

Fig. 6 is a section on the line 6—6 of Fig. 3.

Fig. 7 is a top plan detailed view of the valve mechanism for controlling the supply and circulation of one of the liquids.

Fig. 8 is a section on the line of 8—8 of Fig. 7.

Figs. 9, 10, 11 are detail views.

Fig. 12 is a detail sectional view illustrating a slightly modified form of construction of the dispensing valve.

Referring to the drawings, 1 indicates a supply tank for a liquid that is to be dispensed, as will be later set forth. Where the invention is embodied in an apparatus for making coffee, I fill the tank 1 with water. By preference, the tank 1 is connected with a water supply pipe 2, whereby the water will be supplied as fast as it is used. 3 indicates as an entirety means for heating the water in the tank 1. The heating means may comprise a gas burner 4 of suitable construction, connected to a gas supply pipe 5.

The flow of gas through the pipe 5 may be cut off by a valve 6. 9 indicates a suitable thermostatic device extending through an opening in the side wall of the tank 1 and into the water therein, as shown in Fig. 1. The elements of the thermostatic device act on one or more levers, mounted in the casing 10, which is interposed in the gas pipe 9, and the levers in turn control the opening and closing of a valve in the casing to permit or cut off the flow of gas therethrough to the burner 4, to thereby maintain the water at all times at a predetermined temperature.

11 indicates a pilot pipe for the burner. 12 indicates a cut off valve for the pilot pipe.

Further description of the thermostatic device 9, and its operation will not be necessary, as it is preferably similar in construction to the device shown in the Letters Patent No. 1,367,935 granted to Carl M. Yoder, to which reference may be made.

13 indicates a water receptacle or holder from which the water is dispensed as needed through a dispensing mechanism indicated as an entirety at 14. The receptacle 13 preferably comprises a cylindrical wall 15, a bottom 16 and a closure 17.

18 indicates a combined heating and supply means for the holder 13, whereby heated water is supplied to the holder and the water in the holder is maintained in heated condition and at substantially a predetermined temperature. Of the combined liquid heating and supply means, 19 indicates a pipe leading from the upper portion of the tank 1 to the upper portion of the holder 13. By preference the holder 13 is disposed directly above the tank 1, in which event the pipe 19 extends vertically through a suitable opening 19$^a$ in the bottom 16 and then upwardly within the holder, as shown in Figs. 1 and 2.

20 indicates a coil of suitable construction disposed within the holder 13 and connected to the upper end of the pipe 19, preferably through a casing 21 of a valve mechanism, indicated as an entirety at 22, to be later described. The opposite or discharge end of the coil 20 is connected to a pipe 23, which preferably leads to the lower portion of the tank 1. From the foregoing description it will be apparent that the pipe 19, coil 20 and pipe 23, by reason of the connection of the pipes 19 and 23 with the tank 1, form a hot water circulating system to permit the water heated in the tank 1 to rise in the pipe 19 and flow through the coil 20 and back to the tank through the pipe 23, and that such heated water will operate to heat and maintain heated the water in the holder 13. The valve casing 21 comprises a cylindrical member 21$^a$ and a conduit 21$^b$ surrounding the cylindrical member 21$^a$ and provided with a discharge nipple 21$^c$, which is connected in any desired manner to the upper end of the coil 20. The lower end of the cylindrical member 21$^a$ is open and provided with screw threads, to which the upper end of the pipe 19 is screw threaded. 24 indicates a slot formed in the side walls of the cylindrical member 21$^a$ to form a passage from the cylindrical member 21$^a$ into the conduit 21$^b$, whereby the heated water flowing upwardly in the pipe 19 may be conducted to the coil 20. The upper end of the cylindrical member 21$^a$ is provided with an end wall 25, in which is formed a discharge port 26, having a valve seat 27 at its inner or lower end. 28, 29, indicate a pair of connected valves, the former serving to engage the seat 27 to close the port 26 and the latter serving to close the opening or slot 24, the connection between the valves being such that one is closed when the other is open and vice versa. The valves 28, 29, preferably comprise a cup or piston shape member 31, the annular walls thereof slidably fitting the inner walls of the cylindrical member 21$^a$ and movable downwardly to bridge the slot 24 and close it (see dotted lines in Fig. 8) and the head thereof being provided with an annular boss which serves as a valve to engage and disengage the seat 27. When the valves are in the position shown in Fig. 8, the port 26 is closed and the slot is open, and accordingly the heated water will circulate through the pipe 19, coil 20, and pipe 23 back to the tank 1; but if the valves are operated to their other position, the slot 24 will be closed and the port 26 opened, in which event the circulation of the heated water will be cut off from the coil and caused to flow through the port 26 into the holder 13, openings 32 being formed in the head of the valve member 31 to permit the flow of the water therethrough. This latter operation may be effected to either fill the holder 13 or to replace any heated water that has been discharged therefrom. It will thus be seen that the tank 1 and pipe 19 serve as a single source to (1) supply or fill the holder 13 with heated water and (2) maintain the water in the tank 1 heated at the desired temperature. By closing the slot 24, circulation of the water in the reverse direction through the coil 20 is prevented whenever the port 26 is open. Accordingly it will be understood that I prevent cold water, or water that is cooler than that being supplied by the pipe 19, from entering the holder 13 during filling of the latter. In this connection it may be noted that the thermostatic devices 9 are properly adjusted in order that the burner 4 will heat and keep heated the water in the tank 1 at a high enough temperature to insure the desired degree of temperature in the circulation pipe and the holder 13.

32′ indicates a rod or stem connected to the valve member 31 for operating the valves 28, 19.

33 indicates a wall spaced from but preferably integrally connected by webs 34 with the end wall 25 of the valve casing 21ᵃ. The spaces between the webs 34 form openings for the discharge of the water flowing through the port 26. The wall 33 is formed with an opening 35 which slidably receives the valve stem, the walls of the opening cooperating with the inner walls of the cylindrical member 21ᵃ to support the valve member 31. The rod 32 may be operated in either direction manually, but I prefer to operate it automatically, for example by a float 35' so that it may be actuated by the (1) lowering of the water level in the holder 13, due to dispensing operations, to open the port 26 and (2) rise of the level of the water, due to filling of the holder, to close the port 26. The float 35' is connected to one end of a lever 36. The other end of the lever is pivoted in any desired manner on a bracket 37, preferably comprising a pair of arms integrally connected to the valve casing 21. As shown in Fig. 7, the lever extends diametrically across the casing 21 in position to be pivotally connected, in a well known manner, to the upper end of the valve stem 32'.

The cover 17 preferably comprises an annular member. The outer circumferential edge of the cover is provided with a flange and a depending collar which engage the upper circumferential edge of the side wall 15. The inner circumferential edge of the cover 17 is provided with a downwardly and inwardly inclined wall 17ᵃ, which is adapted to receive and support a container 38 in inverted position. The container 38 serves as a separate source of supply for a liquid which is to be dispensed simultaneously with the liquid supplied to the holder 13. In the present disclosure of the preferred embodiment of the invention the container holds and supplies concentrated coffee in liquid form. It will be understood that the container may be located in any convenient place; it being shown associated with the holder 13 for illustrative purposes only. The container 38 is preferably protected by a housing 39, which may be formed in its side wall with a slot 40 to show the amount of coffee that is contained in the container 38 at all times. When the container 38 is disposed as shown, its mouth projects into a basin 41 to form a seal. The basin 41 is provided with two or more arms 42, each of which rests on a bracket 43 secured to the inner surface of the side wall 15. The basin 41 may be provided with a screen 44. The bottom of the basin 41 is formed with an opening to receive a nipple 45, which in turn is connected, by means of a union 46, to a pipe 47 leading to the dispensing mechanism 14.

Of the dispensing mechanism 14, 14ᵃ indicates a faucet body adapted to be connected at 14ᵃ' to but extending through the side wall 15 of the holder 13 near or adjacent its bottom. The outer end of the faucet body is turned or bent downwardly for well known reasons. The connection 14ᵃ' for the faucet body 14ᵃ is of a liquid tight character. 14ᵇ, 14ᶜ, indicate ducts or conduits extending through said faucet body, preferably from its inner or inlet end to its outer or discharge end. The conduit 14ᵇ opens into the receptacle 13 to receive the water therefrom, but the conduit 14ᶜ is provided at its inner end with a nipple 14ᵈ, to which the pipe 47 is connected in any desired manner, for example, by a union 48. At 14ᵉ, the faucet body is formed with a conical recess, into which the conduits 14ᵇ, 14ᶜ, are merged, such recess serving as a seat for a conical valve 14ᶠ. The valve 14ᶠ is formed with ports 14ᵍ, 14ʰ, so disposed that (1) when the valve is in one position (see Fig. 2), their opposite ends register with the adjacent open ends of the conduits 14ᵇ, 14ᶜ, respectively, thereby permitting flow of the liquids through the two conduits simultaneously and (2) when the valve 14ᶠ is in its other position (see Figs. 3 and 4), both conduits will be closed. The valve 14ᶠ extends upwardly and is provided with a handle 49, by which the valve is oscillated in its seat. The lower end of the valve 14ᶠ extends through the lower side wall of the faucet body 14ᵃ, as shown at 50, such extended end being screw threaded to receive a pair of nuts 51, 51—see Fig. 3. By preference I interpose between the faucet body 14ᵃ and the adjacent nut a spring 52 which holds the valve 14ᶠ to its seat.

From the foregoing description it will be obvious that the faucet body 14ᵃ and valve 14ᶠ, as constructed, constitute a multi-faucet to control the simultaneous discharge and simultaneous cut-off of a plurality of liquids by one operation of a valve, common to all of the discharge conduits, in one direction or the other.

In the preferred form of construction the liquids from the holder 13 and container 38 are simultaneously discharged or dispensed at the outer end of the faucet body 14ᵃ into some receptacle, such as a cup (not shown), wherein mixing of the liquids (water and concentrated coffee) takes place, but it will be understood that the conduits 14ᵇ, 14ᶜ, could merge one with another at or near the outer end of the faucet body 14ᵃ to permit mixing of the liquids while flowing to the receiving receptacle, as shown in Fig. 12.

The operation of the valve 14ᶠ is preferably controlled by the temperature of the liquid within the holder 13. For this purpose I provide means, indicated as an entirety at 53, for locking and unlocking the handle 49 or an arm 54 rigidly connected thereto and thermostatic devices, indicated as an entirety at 55, which control the locking and unlocking means 53.

Of the thermostatic devices 55, 56 indicates a casing provided on the inner side of the wall 15, preferably in close proximity to the dispensing mechanism 14. The casing 56 is preferably formed integral with a plate 57 which covers an opening 15$^a$ formed in the wall 15, such plate being provided to form a rigid support for the thermostatic devices 55, the dispensing mechanism 14, and the locking and unlocking means 53. The plate 57 may be riveted in position in a well known way. The casing 56 is formed in its upper wall with an opening 58, in which is supported a copper tube 59. The copper tube 59 constitutes one element of the thermostatic devices 55, the other element 59$^a$ being arranged within and connected at its upper end to the upper end of the tube 59. The tube 59 being formed of copper readily responds to changes in temperature of the water in the holder 13. As the temperature of the water rises, the tube expands and moves the element 59$^a$ endwise; cooling off the water causes the tube to contract, and such contraction moves the element 59$^a$ downwardly. The lower end of the element 59$^a$ engages an arm 60 fixed to the inner end of a rocker 61. The rocker 61 is mounted in a bearing 62, preferably formed integrally with and extending laterally to either side of the plate 57. The outer end of the rocker 61 carries a lever 63, constituting one element of the locking and unlocking means 53. The connection between the upper ends of the thermostatic elements 59, 59$^a$, is preferably such as to permit adjustment therebetween, whereby operation of arm 60 may be effected accordingly as the temperature of the water in the holder reaches a higher or lower degree of temperature, as desired.

The thermostatic devices 55 may be arranged in any desired position in the holder 13, but by arranging them vertically and adjacent the wall 15, ample space is provided for the coil 20 and pipes 19 and 23. A further advantage obviously results in arranging the thermostatic devices in close proximity to the dispensing mechanism 14 in that the control of the latter will be dependent upon the temperature of the water which surrounds the inlet to the water conduit 14$^b$ of the dispensing mechanism 14.

64 indicates a casing connected to the outer face of the plate 57 and co-operating with a base plate 65, preferably formed integral with the plate 57, to form an enclosure for the locking and unlocking means 53. The base plate 65 and outer side wall of the casing 64 are cut away to form a slot through which the arm 54 moves when the valve 14$^f$ is operated. 66 indicates a lug preferably formed integrally with the plate 57 and base plate 65. The lug is formed with a bearing opening for a pin 67 on which a dog 68 is mounted for oscillation. The dog is normally arranged in the path of movement of a shoulder 54$^a$ provided on the arm 54 so as to lock the arm against movement to the valve opening position. The dog 68 preferably terminates in a knife edge and the shoulder 54$^a$ is inclined inwardly to form a knife edge at its upper or free edge. As a result of this form of construction, movement of the arm will be prevented as the inclined face of the shoulder will guide the dog downwardly against the rear portion of the shoulder, unless the dog 68 has been moved to a position to entirely clear the shoulder 54$^a$. The dog 68 is preferably held in its normal position by a spring 69 connected to the tail of the dog and the casing 64 (see Fig. 5). As will be understood from Figs. 3 and 4, the lever 63 is arranged in the vertical plane of the dog 68 and bears at its free end on the tail of the latter, so that when the thermostatic elements act to relieve pressure on the arm 60, the lever 63, under the influence of a spring 70, will operate the dog 68 to move it to a position out of the path of movement of the arm 54, thereby unlocking the latter. The thermostatic devices 55 are adjusted so that the thermostatic element 59$^a$ will engage the arm 60 and through it elevate the outer end of the lever 63 so long as the temperature of the water is below that degree at which it is desired to dispense it. But as the water rises in temperature, the element 59$^a$ will move upwardly until the desired predetermined degree of temperature is reached, at which time the dog 68 will be operated by the lever 63, as just described.

The conduits 14$^b$, 14$^c$, and the ports 14$^g$, 14$^h$, being of a predetermined size, they permit of uniform quantities of the liquids to flow through them for mixing when the valves for the conduits are opened. Where a beverage, such as coffee, is to be made, it may be desirable to change the strength thereof to suit different tastes or to make a uniform beverage where the ingredients themselves, before mixing, are not uniform. To permit of the varying of the proportions of the liquids to be mixed, I combine with the valve 14$^f$ a supplemental valve 71 whereby the size of one port therethrough may be reduced to restrict the quantity of liquid which flows through it during the period that the valve 14$^f$ remains in the open position, as compared to that which flows through the other port in the same period. The supplemental valve 71 is preferably arranged to restrict the port through which the concentrated coffee flows. For this purpose, the body portion of the valve 14$^f$ is formed with a conical opening 72, extending from its inner end downwardly, to form a seat for the valve 71. As shown, the valve 71 is formed with a port 73 which registers at its opposite ends with the port 14$^h$ formed in the valve 14$^f$. The valve 71 is adjustable about its axis to move its port out of registry with the port 14$^h$ to a greater or less extent, as desired. Such adjustment has the effect of restricting the size of the port 14$^h$ so that the quantity of concentrated coffee discharged or dispensed will be reduced.

The valve 71 is provided at its upper end with a stem 74 to which is secured a handle 75. The handle 75 is preferably provided with a pointer 76 which is movable relative to a graduated scale 77. The scale 77 is provided on an arcuate plate which forms a part of the arm 54. 78 indicates a cap having screw threaded connection with the internal walls of the hub 49$^a$ connecting the handle 49 and arm 54 together. The cap 78 forms an abutment for one end of a coiled spring 79 surrounding the reduced portion of the valve stem 74 and bearing at its other end against the body portion of the valve 71 to maintain the latter in its seat.

80 indicates an overflow pipe for the holder 13 leading to any suitable place of discharge (not shown). The pipe 80 preferably extends through the bottom of the holder 13. 81 indicates a valved drain pipe leading from the bottom 16 of the holder 13. The pipe 81 may be connected to the overflow pipe 80 or lead to a suitable place of discharge (not shown).

Those portions of the pipes 19 and 23, which are arranged inside the holder 13, are preferably connected by unions 19', 23', respectively, within the holder with pipe sections mounted in openings formed in the bottom 16 of the holder 13. This arrangement permits these portions of the pipes 19, 23 and the coil 20 to be positioned in and removed from the holder 13, as a unit.

From the foregoing description it will be seen that I provide for the rapid and economical dispensing of a plurality of liquids. It will also be seen that I provide for the continuous supply and heating of one of the liquids in a simple manner. The construction is such that one of the liquids may be automatically supplied and automatically maintained at the desired temperature, thereby saving in fuel cost. My apparatus is also advantageous for the reason that all labor involved in filling and refilling the supply tank or the holder and attending to the heating means is eliminated. By controlling the dispensing mechanism by the temperature of the liquid in one of the holders, premature dispensing of the liquid or liquids is prevented. As the valve for one liquid discharge conduit is common to the other liquid discharge conduit and such valve is controlled by the temperature of one of the liquids, no waste of either thereof can occur due to operation of the valve prematurely.

It is obvious that instead of the gas burner 4, other forms of heating means may be used to heat the water in the tank 1, if desired.

As shown in the drawing, the handle 49 is operated a quarter turn from the position shown in Fig. 4 to the position shown in Fig. 2 to open the discharge conduits 14$^b$, 14$^c$. To limit the movement of the handle in either direction, I prefer to provide the faucet body with projections 82, 83, which are adapted to be engaged by a pin 82' depending from the handle.

85 indicates a faucet, preferably connected in the circulation pipe 23, to permit draining of the tank 1 when desired.

To those skilled in the art of making apparatus of the class herein described, many alterations in construction and widely differing embodiments and applications of my invention will suggest themselves, without departing from the spirit and scope thereof. My disclosures and the descriptions herein are purely illustrative and are not intended to be in any sense limiting.

What I claim is:

1. In apparatus of the character described, the combination of a plurality of sources of supply for liquids, a device for dispensing said liquids, a receptacle intermediate said dispensing device and the source of supply for one of said liquids, and a valve mechanism controlled by the level of the liquid in said receptacle for admitting and cutting off the liquid supply to said receptacle, said source of supply being adapted to maintain a circulation of the said liquid supply through the receptacle during the period when the valve mechanism has cut off the liquid supply to the receptacle.

2. In apparatus of the character described, the combination of a plurality of sources of supply for liquids, a device for dispensing said liquids, a receptacle intermediate said dispensing device and the source of supply for one of said liquids, a valve mechanism controlled by the level of the liquid in said receptacle for admitting and cutting off the liquid supply to said receptacle, and means for heating the liquid which flows through said receptacle.

3. In apparatus of the character described, the combination of a plurality of sources of supply for liquids, a device for dispensing said liquids, a receptacle intermediate said dispensing device and the source of supply for one of said liquids, a valve mechanism controlled by the level of the liquid in said receptacle for admitting and cutting off the liquid supply to said receptacle, means for heating the liquid which flows through said receptacle, and thermo means for controlling the operation of said dispensing device.

4. In apparatus of the character described, the combination of a plurality of sources of supply for liquids, a device for dispensing said liquids, a receptacle intermediate said dispensing device and the source of supply for one of said liquids, a valve mechanism controlled by the level of the liquid in said receptacle for admitting and cutting off the liquid supply to said receptacle, means for heating the liquid which flows through said receptacle, and means, including thermostatic elements disposed in said receptacle, for controlling the operation of said dispensing device.

5. A dispensing mechanism comprising a receptacle for liquid, means tending to maintain the liquid in said receptacle at a predetermined temperature, a discharge conduit leading from said receptacle, and a valve in said conduit, in combination with means for locking and unlocking said valve, and thermo means actuated by the temperature of the liquid in said receptacle for controlling said locking and unlocking means.

6. In apparatus of the class described, the combination of a receptacle for liquid, a dispensing means for said receptacle, means for circulating a temperature changing medium through said receptacle, and means for automatically discharging the medium from said circulating means into said receptacle.

7. In apparatus of the class described, the combination of a receptacle for liquid, a dispensing means for said receptacle, means for circulating a temperature changing medium through said receptacle, and means actuated by the rise and fall of the level of the liquid in said receptacle for automatically discharging the medium from said circulating means into said receptacle.

8. In apparatus of the class described, the combination of a receptacle for liquid, a dispensing means for said receptacle, means for circulating a temperature changing medium through said receptacle, means for automatically discharging the medium from said circulating means into said receptacle, and means actuated by the rise and fall in temperature of the liquid in said receptacle for controlling the operation of said dispensing means.

9. A dispensing mechanism comprising a receptacle for liquid, means tending to maintain the liquid in said receptacle at a predetermined temperature, a discharge conduit leading from said receptacle, and a valve for said conduit, in combination with means for locking and unlocking said valve, thermo means actuated by the change in temperature of the liquid in said receptacle for controlling said locking and unlocking means, and means for adjusting said thermo means.

10. In apparatus of the class described, the combination of a plurality of sources of liquid supply, means tending to maintain the liquid in one of said sources of supply at a predetermined temperature, discharge conduits for said liquids, means for controlling the flow of the liquid through one of said conduits, means for locking and unlocking said controlling means, and thermo devices actuated by the rise and fall in temperature of the liquid in the source of supply that is maintained at a predetermined temperature for controlling said locking and unlocking means.

11. A dispensing mechanism comprising a plurality of sources of liquid supply, one of which consists of a receptacle containing liquid, means tending to maintain the liquid in said receptacle at a predetermined temperature, discharge conduits for said liquids, and valve means for controlling the flow of liquid from said conduits, in combination with means for locking and unlocking said valve means, and thermo means actuated by the temperature of the liquid in said receptacle for controlling the said locking and unlocking means.

12. A dispensing mechanism comprising a plurality of sources of liquid supply, one of which consists of a receptacle containing liquid, means tending to maintain the liquid in said receptacle at a predetermined temperature, discharge conduits for said liquids, and a valve common to said conduits, in combination with means for locking and unlocking said valve, and thermo means actuated by the temperature of the liquid in said receptacle for controlling said locking and unlocking means.

13. A dispensing mechanism comprising a plurality of sources of liquid supply, one of which consists of a receptacle containing liquid, means tending to maintain the liquid in said receptacle at a predetermined temperature, discharge conduits for said liquids, and a valve common to said conduits, in combination with means for locking and unlocking said valve, thermo means actuated by the temperature of the liquid in said receptacle for controlling said locking and unlocking means, and means for adjusting said thermo means.

14. In a dispensing mechanism, the combination of a plurality of sources of liquid supply having discharge conduits, a valve common to said conduits and arranged to simultaneously control the flow of the liquids therethrough, and means carried by said valve for varying the flow of liquid through one of said conduits.

15. In a dispensing mechanism, the combination of a plurality of sources of liquid supply having discharge conduits, a valve common to said conduits and formed with ports arranged to register therewith, respectively, to simultaneously permit or cut off the flow of the liquids therethrough, and means carried by said valve and movable relative thereto for varying the flow of liquid through one of the ports of said valve.

16. In a dispensing mechanism, the combination of a plurality of sources of liquid supply each having a discharge conduit, means tending to maintain one of said sources of supply at a predetermined temperature, a valve common to said discharge conduits and formed with ports arranged to register therewith, respectively, and to simultaneously permit or cut off the flow of the liquids therethrough, means carried by said valve for varying the flow of liquid through one of the ports of said valve, means for locking and unlocking said valve, and means actuated by the temperature of the liquid in that source of supply acted on by said temperature maintaining means for controlling said locking and unlocking means.

17. In apparatus of the class described, the combination of a liquid holding receptacle having a discharge conduit, a conduit for a fluid leading from a source of supply through said receptacle, that portion of the conduit arranged in said receptacle being formed with a port through which the fluid in said conduit may flow into said receptacle, and a valve for closing said port.

18. In apparatus of the class described, the combination of a liquid holding receptacle having a discharge conduit, a conduit for a fluid leading from a source of supply through said receptacle, that portion of the conduit arranged in said receptacle being formed with a port through which the fluid in said conduit may flow into said receptacle, a valve for closing said port, and a float in said receptacle for controlling the operation of said valve.

19. In apparatus of the class described, the combination of a liquid holding receptacle having a discharge conduit, a fluid conduit leading from a source of supply through said receptacle, said conduit being formed with a port opening into said receptacle, and valve devices serving to alternately stop the flow of the fluid through said fluid conduit and open said port and vice versa.

20. In apparatus of the class described, the combination of a liquid holding receptacle having a discharge conduit, a fluid conduit leading from a source of supply through said receptacle, said fluid conduit being formed with a port opening into said receptacle, valve devices serving to alternately stop the flow of the fluid through said fluid conduit and open said port and vice versa, and a float in said receptacle for controlling the operation of said valve devices.

21. In apparatus of the class described, the combination of a liquid holder having a discharge conduit, a circulation pipe including a coil in said holder through which heated liquid flows, a source of supply to which the inlet and outlet ends of said pipe are connected, means for heating said source of supply, and valve mechanism interposed in said pipe within said holder for discharging the liquid therefrom into said holder.

22. In apparatus of the class described, the combination of a liquid holder having a discharge conduit, a circulation pipe including a coil in said holder through which heated liquid flows, a source of supply to which the inlet and outlet ends of said pipe are connected, means for heating said source of supply, valve mechanism interposed in said pipe within said holder for discharging the liquid therefrom into said holder, and a float in said holder for operating said valve mechanism.

23. In apparatus of the class described, the combination of a liquid holder having a discharge conduit, a circulation pipe including a coil in said holder through which heated liquid flows, a source of supply to which the inlet and outlet ends of said pipe are connected, means for heating said source of supply, and valve mechanism interposed in said pipe within said holder for discharging the liquid therefrom into said holder and for preventing backward flow of the liquid through the outlet connection of said pipe with said scource of supply.

24. In apparatus of the class described, the combination of a liquid holder having a discharge conduit, a circulation pipe including a coil in said holder through which heated liquid flows, a source of supply to which the inlet and outlet ends of said pipe are connected, means for heating said source of supply, and valve mechanism interposed in said pipe within said holder for discharging the liquid therefrom into said holder and for shutting off the flow of the liquid through said pipe at a point adjacent the point of discharge into said holder.

25. In apparatus of the class described, the combination of a liquid holder having a discharge conduit, a circulation pipe including a coil in said holder through which heated liquid flows, a source of supply to which the inlet and outlet ends of said pipe are connected, means for heating said source of supply, valve mechanism interposed in said pipe within said holder for discharging the liquid therefrom into said holder and for shutting off the flow of liquid through said pipe at a point adjacent the point of discharge into said holder, and a float in said holder for controlling said valve mechanism.

26. In apparatus of the class described, the combination of a liquid holder having a discharge conduit, a circulation pipe including a coil in said holder through which heated liquid flows, a source of supply to which the inlet and outlet ends of said pipe are connected, means for heating said source of supply, and a valve mechanism comprising a casing interposed in said pipe having a liquid passage and a port leading into said holder and a pair of connected valves for closing said liquid passage through said casing and opening said port and vice versa.

27. In apparatus of the class described, the combination of a liquid holder having a discharge conduit, a circulation pipe including a coil in said holder through which heated liquid flows, a source of supply to which the inlet and outlet ends of said pipe are connected, means for heating said source of supply, and a valve mechanism comprising a casing interposed in said pipe having a liquid passage and a port leading into said holder, a pair of connected valves for closing said liquid passage through said casing and opening said port and vice versa and a float in said holder for controlling said valves.

28. In apparatus of the class described, the combination of a liquid holder having a valved discharge conduit, a circulation pipe including a coil in said holder through which heated liquid flows, a source of supply to which the inlet and outlet ends of said pipe are connected, means for heating said source of supply, a valve mechanism interposed in said pipe within said holder for discharging the liquid therefrom into said holder, and means actuated by the temperature of the liquid in said holder for controlling the operating of the valve in said discharge conduit.

29. In apparatus of the class described, the combination of a liquid holder, a tank for the liquid, means for heating the liquid in said tank, a liquid connection leading from said tank to and through said holder and back to said tank, whereby the liquid that is heated will flow through said holder and heat the liquid therein, and a valve mechanism arranged in said holder and interposed in said connection, whereby the liquid in said connection may be discharged in said holder.

30. In apparatus of the class described, the combination of a liquid holder, a tank for the liquid, means for heating the liquid in said tank, a liquid connection leading from said tank to and through said holder and back to said tank, whereby the liquid that is heated will flow through said holder and heat the liquid therein, a valve mechanism arranged in said holder and interposed in said connection, whereby the liquid in said connection may be discharged in said holder, and a float in said holder for controlling the valve of said valve mechanism.

31. In apparatus of the class described, the combination of a liquid holder, a tank for the liquid, means for heating the liquid in said tank, a liquid connection leading from said tank to and through said holder and back to said tank, whereby the liquid that is heated will flow through said holder and heat the liquid therein, and a valve mechanism arranged in said holder and interposed in said connection for stopping the flow of liquid therethrough and discharging it into the holder.

32. In apparatus of the class described, the combination of a liquid holder, a tank for the liquid, means for heating the liquid in said tank, a liquid connection leading from said tank to and through said holder and back to said tank, whereby the liquid that is heated will flow through said holder and heat the liquid therein, a valve mechanism arranged in said holder and interposed in said connection for stopping the flow of liquid therethrough and discharging it into the holder, and a float in said holder for controlling the operation of the valve of said valve mechanism.

33. In apparatus of the class described, the combination of a liquid holder, a tank for the liquid having a valved discharge conduit, means for heating the liquid in said tank, a liquid connection leading from said tank to and through said holder and back to said tank, whereby the liquid that is heated will flow through said holder and heat the liquid therein, a valve mechanism arranged in said holder and interposed in said connection, whereby the liquid in said connection may be discharged in said holder, a float in said holder for controlling the valve of said valve mechanism, and means actuated by the temperature in said holder for controlling the operation of the valve in said discharge conduit.

34. In apparatus of the class described, the combination of a liquid holder, a tank for the liquid having a valved discharge conduit, means for heating the liquid in said tank, a liquid connection leading from said tank to and through said holder and back to said tank, whereby the liquid that is heated will flow through said holder and heat the liquid therein, a valve mechanism arranged in said holder and interposed in said connection, whereby the liquid in said connection may be discharged in said holder, means actuated by the temperature in said holder for controlling the operation of the valve in said discharge conduit, and means for controlling the heating means for said tank.

35. In apparatus of the character described, the combination of a faucet body having a plurality of conduits, a plurality of liquid holders, each connected to one of said conduits, means for maintaining the liquid in one of said receptacles at a predetermined temperature, said means being provided with a discharge port through which liquid is supplied to one of said holders, and valves for controlling the discharge of the liquids through the conduits of said faucet body.

36. In apparatus of the character described, the combination of a faucet body having a plurality of conduits, a plurality of liquid holders, each connected to one of said conduits, means for maintaining the liquid in one of said receptacles at a predetermined temperature, said means being provided with a valved discharge port through which liquid is supplied to the last mentioned holder, means dependent on the level of the liquid in the holder supplied by said valved discharge port for controlling the operation of the valve therefor, and valves for controlling the discharge of the liquids through the conduits of said faucet body.

37. In apparatus of the character described, the combination of a faucet body having a plurality of conduits, a plurality of liquid holders, each connected to one of said conduits, means for maintaining the liquid in one of said receptacles at a predetermined temperature, said means being provided with a discharge port through which liquid is supplied to one of said holders, valves for discharging the liquids through the conduits of said faucet body, and means affected by the rise and the fall of the temperature of the liquid in the holder acted upon by said temperature maintaining means for controlling the operation of said valves.

38. In apparatus of the class described, the combination of a plurality of discharge conduits, a plurality of liquid holders, each connected to one of said conduits, means tending to maintain the liquid in one of said receptacles at a predetermined temperature, said means being provided with a discharge port through which liquid is supplied to one of said receptacles, and valves for controlling the discharge of the liquids through said conduits.

39. In apparatus of the class described, the combination of a plurality of discharge conduits, a plurality of liquid holders, each connected to one of said conduits, means for maintaining the liquid in one of said holders at a predetermined temperature, said means being provided with a valved discharge port through which liquid is supplied to the last mentioned holder, to one of said holders, means dependent on the level of the liquid in the holder supplied by said valved discharge port for controlling the operation of the valve therefor, and valves for controlling the discharge of the liquids through said conduits.

40. In apparatus of the class described, the combination of a plurality of discharge conduits, a plurality of liquid holders, each connected to one of said conduits, means for maintaining the liquid in one of said holders at a predetermined temperature, said means being provided with a discharge port through which liquid is supplied to one of said holders, valves for controlling the discharge of the liquids through said conduits, and means affected by the rise and fall of the temperature of the liquid in the holder acted upon by said temperature maintaining means for controlling the operation of said valves.

In testimony whereof I have hereunto subscribed my name.

HOWARD I. MORRIS.